United States Patent Office 3,629,215
Patented Dec. 21, 1971

3,629,215
1:1 ALTERNATING COPOLYMERS OF SUBSTITUTED CONJUGATED VINYL COMPOUNDS AND OLEFINIC COMPOUNDS AND PROCESS FOR PRODUCING THE SAME
Kohei Nakaguchi, Osaka, Shohachi Kawasumi, Kobe, Masaaki Hirooka, Ibaraki-shi, Hiroshi Yabuuchi, Takatsuki-shi, and Hiroyoshi Takao, Ashiya-shi, Japan, assignors to Sumitomo Chemical Company, Ltd., Osaka, Japan
No Drawing. Continuation of application Ser. No. 567,353, July 25, 1966. This application Oct. 31, 1969, Ser. No. 871,781
Claims priority, application Japan, July 30, 1965, 40/46,495
Int. Cl. C08f 3/40, 3/62, 3/74
U.S. Cl. 260—85.5 HC        41 Claims

ABSTRACT OF THE DISCLOSURE

An alternating copolymer consists of [A] a terminally unsaturated olefinic compound, for example, an α-olefin, an isoolefin, or a halogenated olefinic compound (vinyl chloride, vinylidene chloride, allyl chloride or the like) and [B] a substituted conjugated vinyl compound, such as a substituted acrylonitrile or a substituted acrylic acid derivative (esters, amides, acids, acid halides, ketones, acrolein and the like) which has a substituent, such as a hydrocarbon, halogenated hydrocarbon or halogen substituent on the α- or β-position. Said alternating copolymer can be prepared by subjecting said monomers to copolymerization with an organoaluminum halide or an organoboron halide or a product of reaction between an organic compound of a metal of Groups IIb, IIIb and IVb of the Periodic Table and a halide of a metal of Groups IIIb and IVb of the Periodic Table in the presence of at least said substituted conjugated vinyl compound, at least one of said organic compound and halide being aluminum or boron-containing compound.

---

This application is a continuation of application Ser. No. 567,353, filed July 25, 1966, and now abandoned.

This invention relates to copolymers of substituted conjugated vinyl compounds and olefinic compounds, and a proces for producing the same. More particularly, the invention provides alternating copolymers of α- or β-substituted conjugated vinyl compounds and olefinic unsaturated compounds, and a method for the production of said copolymers.

The present inventors already found alternating copolymers of conjugated vinyl compounds having nitrile, carbonyl or thiocarbonyl groups at the conjugated positions of carbon-carbon double bonds, such as acrylonitrile acrylic acid derivatives or thioacrylic acid derivatives, and olefinic unsaturated compounds such as olefins or halo-olefins, and provided a process for producing copolymers using said monomers. As the result of further studies, the present inventors have found that this kind of complex copolymerization can be extended to substituted conjugated vinyl compounds having substituents in the α- or β-positions of the above-mentioned vinyl compounds and have discovered a group of novel alternating copolymers, and have thus attained the present invention.

Thus, the present invention provides alternating copolymers of [A] an olefinic compound having the formula:

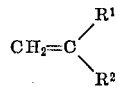

wherein $R^1$ and $R^2$ are respectively hydrogen atom, halogen atoms, hydrocarbon radicals having 1 to 20 carbon atoms, halogen-containing hydrocarbon radicals having 1 to 20 carbon atoms, or substituted radicals thereof, and [B] a substituted conjugated compound having the formula:

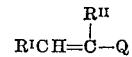

wherein $R^I$ and $R^{II}$ are respectively hydrogen or halogen atoms or hydrocarbon radicals having 1 to 20 carbon atoms, halogen-containing hydrocarbon radicals having 1 to 20 carbon atoms, substituted hydrocarbon radicals thereof, either of $R^I$ and $R^{II}$ is hydrogen atom but both of them are not hydrogen at the same time; and Q is a nitrile or

group, wherein Y is $Z^2H$, $Z^2R$, $Z^2Me$, $MR'R''$, R, halogen atoms or hydrogen atom; in which $Z^1$ and $Z^2$ are respectively an oxygen or sulfur atom; R is an organic radical having 1 to 20 carbon atoms; R' and R" are respectively hydrogen atom or organic radicals having 1 to 20 carbon atoms, including the case where R' and R" are mutually bonded at other portion than nitrogen; and Me represents a monovalent portion of an element of Groups I to III of the Mendeleev's Periodic Table or an ammonium group.

Further, the present invention provides a process for producing copolymers, which comprises contacting said olefinc compound and substituted conjugated vinyl compound with (1) an organo-metal halide having the formula:

$$MR'''_nX_{3-n}$$

wherein M is aluminum or boron; R''' is an organic radical; X is a halogen atom; and n is an arbitrary number from 1 to 2, or a mixture of at least two compounds having the following formulas:

(A) $MR'''_nX_{3-n}$, (B) $M'R^{IV}_3$ and (C) $M''X'_3$ wherein M, M' and M" are aluminum or boron; R''' and $R^{IV}$ are organic radicals; X and X' are halogen atoms; and n is an arbitrary number from 1 to 2, or with (2) catalyst components (a) an organo-compound of a metal of Group IIb, IIIb or IVb of the Mendeleev's Periodic Table and catalyst components (b) a halogeno-compound of a metal of Group IIIb or IVb of the Mendeleev's Periodic Table, wherein at least one of (a) and (b) is a compound of aluminum or boron, and (a) must be contacted with (b) in the presence of at least substituted conjugated vinyl compound of the monomers employed.

Still further the present invention provides a process for producing copolymers in which the abovementioned copolymerization reaction is effected in the presence of oxygen or an organic peroxide, if necessary.

The alternating copolymers of the present invention are novel copolymers. Many combinations of [A] and [B] group monomers have been known to produce always random copolymers. It is, therefore, quite unexpected that the combinations of these kinds of monomers give alternating copolymers.

In order to obtain the alternating copolymers in accordance with the process of the present invention, the nature of catalyst components is important. The process of the present invention requires aluminum or boron as a metal component, and further requires the presence of an organic group and a halogen atom in combination therewith. Other important nature is that the metal component is coordinated with the conjugated compound. Particularly, the coordination to a halogen-containing metal component is of significance, and the copolymerization reaction proceeds through this kind of coordinated complex. The substituted conjugated vinyl compound is required to be such that the polar group thereof is in position conjugated with carbon-carbon double bond. This is very important in copolymerization to give alternating copolymers.

In case of using the catalyst components of (a) an organo-compound of a metal from Groups IIb, IIIb and IVb of the Mendeleev's Periodic Table and (b) a halogeno-compound of a metal from Groups IIIb and IVb of the table, it is not the case that the catalyst components (a) and (b) are previously mixed and then the mixture is employed as the polymerization catalyst. Such mixed catalyst is not suitable for the production of at least the alternating copolymer. In order to obtain the alternating copolymer according to the present invention the catalyst components (a) and (b) must be contacted each other in the presence of at least the conjugated compound. That is, for example, the copolymerization may be effected by contacting catalyst components (b) with conjugated compound previously and then adding catalyst components (a) thereto.

In the process of the present invention, the combination of monomers is of importance. No alternating copolymers can be obtained unless the olefinic compounds are used in combination with the substituted conjugated vinyl compounds. The olefinic compounds employed in the present invention must be low in $e$-value of $Q-e$ reactivity index proposed by Price-Alfrey, and those having an $e$-value below 0.5, especially a minus $e$-value, give favorable results.

In the process of the present invention, the presence of polar solvents or polar substances is not desirable, in general. Particularly, the presence of components forming complexes with the metal components employed in the present invention is not preferable. For example, ethers such as ethylether, tetrahydrofuran and dioxane; ketones such as acetone; esters; nitriles and amides such as dimethylformamide are not usable, and alcohols and water are neither preferable.

In the process of the present invention, when the polymerization is effected in the presence of oxygen or an organic peroxide, the reaction is promoted, in general, or the polymerization can be effected by use of a relatively small amount thereof. It is, however, needless to say that no alternating copolymer can be obtained by mere addition of oxygen or an organic perixode to the mixture of an olefinic compound and a substituted conjugated vinyl compound. Further, no alternating copolymer can either be obtained by mere use of a catalyst system prepared by combining trialkylboron or trialkyl-aluminum with oxygen or an organic peroxide. That is, the process of the present invention is different from the mere conventionally known radical polymerization reactions using organic metals.

The promoting mechanism of oxygen and organic peroxide in the process of the present invention is not sufficiently clear, but it is not considered that they show the same roles as those of conventional initiators in radical polymerization systems in which zinc chloride has been coordinated with methyl methacrylate or acrylonitrile. This is clear also from the fact that the polymerization in accordance with the present invention cannot be promoted by use of all kinds of radical initiators. In the process of the present invention, the excellent promoting effect can be seen only by addition of oxygen or an organic peroxide, and no effect can be attained at all in the case of using other radical initiator containing no oxygen, such as azobisisobutyronitrile.

In the olefinic compounds having the formula:

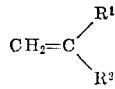

wherein, $R^1$ and $R^2$ are individually hydrocarbon groups such as alkyl, aryl, aralkyl, alkylaryl, cycloalkyl and bridged ring hydrocarbons; said hydrocarbon groups substituted with halogens; halogen atoms such as chlorine, bromine, iodine and fluorine; or hydrogen atom. It is of importance that the hydrocarbon groups or halogen-substituted hydrocarbon groups do not contain any polymerizable group, i.e. unsaturated group causing polymerization reaction. Further, said hydrocarbon group may be substituted with other inert substituent. It is, however, required that said substituent should not be conjugated with the double bond.

That is, preferable olefinic unsaturated compounds having the general formula:

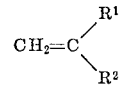

are general olefinic compounds such as α-olefins and said olefins substituted with halogens or other inert groups. Examples of these compounds are olefins such as ethylene, propylene, butene-1, isobutene, pentene-1, hexene-1, heptene-1, octene-1, 2-methyl-butene-1, 3-methyl-butene-1, 2-methyl-pentene-1, 4-methyl-pentene-1, 4-methyl-hexene-1, decene-1, dodecene-1, octadecene-1, 4-phenyl-butene-1, styrene, α - methyl - styrene, α-butyl-styrene, p-methyl-styrene, m-methyl - styrene, vinyl - cyclobutane, vinyl-cyclohexane, isopropenyl-benzene, vinyl-naphthalene, 1-methylene-cyclobutane and allyl-benzene, and halogen-containing olefinic unsaturated compounds such as vinyl chloride, vinyl bromide, vinyl iodide, allyl chloride, allyl bromide, allyl iodide, 4-chloro-butene-1, 4,4,4-trichloro-butene-1, p-chloro-styrene, o-chloro-styrene, m-bromo-styrene, p-iodo-styrene, p-fluoro-styrene, 4-chloro-vinyl-cyclohexane, p-chloro-allyl-benzene, 2,4-dichloro-styrene, 2,6-dichloro-styrene, 2,4-difluoro-styrene, 3-trifluoromethyl-styrene, 4-chloro-1-vinyl-naphthalene, vinylidene chloride, vinylidene bromide, 2-chloro-propene-1, 1-bromo-1-chloro-ethylene, 2-chloro-allyl chloride, methallyl chloride, and 1,1-bis(p-chlorophenyl)-ethylene.

In the present invention, the substituted conjugated vinyl compound having the formula

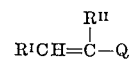

include β-substituted vinyl compounds having the formula $R^ICH=CH-Q$ and α-substituted vinyl compounds having the formula

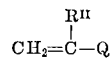

wherein $R^I$ and $R^{II}$ are as defined before. As $R^I$, $R^{II}$ hydrocarbon radicals such as alkyl, aryl, aralkyl, alkylaryl and cycloalkyl; said radicals substituted with halogens or other inert groups; or halogens are frequently employed. As the halogens, there are used chlorine, bromine, iodine and fluorine. Further, in Q, the organic radicals having 1 to 20 carbon atoms which are represented by R, R' and R'', are preferably ordinary hydrocarbon groups, and inert substituted groups thereof may also be used. Such groups are, for example, alkyl, aryl, aralkyl, alkylaryl and cycloalkyl groups. As the halogens employed in Y, there may be raised chlorine, bromine, iodine and fluorine. Me represents a monovalent portion of an element of Groups I to III of the Mendeleev's Periodic Table or an ammonium group. Such element includes, for example, lithium, sodium, potassium, rubidium, cesium, copper, silver, beryllium, calcium, strontium, barium, magnesium, zinc, cadmium, mercury, boron, aluminum and gallium. The monovalent portion referred to herein means that in case a metal element of Groups I to III of the Mendeleev's Periodic Table is represented by Me', the Me belonging to a divalent element means Me'/2 and that of a trivalent element is Me'/3. That is, the above concretely corresponds to

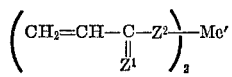

in the case of a divalent element, and to

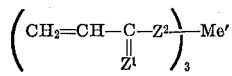

in the case of trivalent element. Of these, monovalent salts, i.e. salts of elements of Group I, and ammonium salt are particularly preferable. NR'R" includes the case where R' and R" are mutually bonded at other portion than nitrogen, fo example, morpholino, pyrrolidino and piperadino groups.

That is, the above compounds includes α- or β- substituted acrylates, thiolacrylates, thionacrylates, dithioacrylates, acrylamide, thioacrylamide, N-substituted acrylamides, N-substituted thioacrylamides, N,N-disubstituted acrylamides, N,N-disubstituted thioacrylamides, acryloyl halides, thioacryloyl halides, acrylic acid, thiolacrylic acid, thionacrylic acid, dithioacrylic acid, salts of these acids, acrolein, unsaturated ketones, and acrylonitrile. Concretely, examples of these compounds are methyl methacrylate, ethyl methacrylate, propyl methacrylate, butyl methacrylate, octyl methacrylate, octadecyl methacrylate, benzyl methacrylate, phenyl methacrylate, tolyl methacrylate, cyclohexyl methacrylate, 2 - chloroethyl methacrylate, methyl thiolmethacrylate, ethyl thiolmethacrylate, methyl α-ethylacrylate, ethyl α-butylacrylate, methyl α-cyclohexylacrylate, methyl α-phenylacrylate, methyl α-chloroacrylate, ethyl α-chloroacrylate, methyl α-bromoacrylate, methyl α-chloromethylacrylate, methyl α-(p-chlorophenyl) acrylate, methacrylamide, N-ethyl methacrylamide, N-cyclohexyl-methacrylamide, N,N-dimethyl methacrylamide, methacrylyl piperidine, α-ethyl-acrylamide, α - chloroacrylamide, α - ethyl-methacryloyl chloride, methacrylic acid, thiomethacrylic acid, sodium methacrylate, zinc methacrylate, aluminum methacrylate, ammonium α-fluoroacrylate, methacrolein, methyl-isopropenyl-ketone, 1 - chloro-butenyl-ethyl-ketone, methacrylonitrile, α - ethyl-acrylonitrile, α-cyclohexyl-acrylonitrile, α-chloroacrylonitrile, α-chloromethyl acrylonitrile, methyl crotonate, ethyl crotonate, butyl crotonate, phenyl crotonate, cyclohexyl crotonate, crotonamide, crotonic acid chloride, crotonitrile, methyl cinnamate, ethyl cinnamate, butyl cinnamate, chloromethyl cinnamate, cinnamic nitrile, methyl β-ethyl acrylate and methyl β-chloromethyl acrylate.

The catalyst components to be used in the process of the present invention are (1) compounds having the formula $MR'''_nX_{3-n}$, $M'R^{IV}_3$ or $M''X'_3$ wherein M, M' and M" are aluminum or boron; R''' and $R^{IV}$ are organic radicals; X and X' are halogen atoms; and $n$ is an arbitrary number of 1 to 2, or (2) (a) organic compounds of metals of Group IIb, IIIb or IVb of the Mendeleev's Periodic Table and (b) halides of metals of Group IIIb or IVb of the Periodic Table.

In the aluminum or boron compounds having the formula $MR'''_nX_{3-n}$, $M'R^{IV}_3$ or $M''X'_3$, R''' and $R^{IV}$ are preferably hydrocarbon radicals having 1 to 20 carbon atoms, or inert substituted groups thereof may be effectively used. For example, compounds having alkyl, alkenyl, aryl, aralkyl, alkylaryl or cycloalkyl groups are particularly effective. Examples thereof are methyl, ethyl, propyl, butyl, hexyl, octyl, decyl, dodecyl, stearyl, phenyl, tolyl, naphthyl, benzyl, cyclopentadienyl and cyclohexyl. As the X and X', there are used chlorine, bromine, iodine and fluorine.

Concretely, compounds having the formula $MR'''_nX_{3-n}$ include, for example, methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, allylaluminum dichloride, ethylaluminum sesquichloride, ethylaluminum sesquibromide, ethylaluminum sesquifluoride, methylaluminum sesquichloride, diethylaluminum chloride, diethylaluminum fluoride, ethylphenylaluminum chloride, dicyclohexylaluminum chloride, methylboron dichloride, ethylboron dichloride, ethylboron diiodide, butylboron dichloride, hexylboron dichloride, dodecylboron dichloride, phenylboron dichloride, benzylboron dichloride, cyclohexylboron dichloride, diethylboron chloride, diethylboron bromide, dipropylboron chloride, dibutylboron chloride, dihexylboron chloride, ethylvinylboron chloride and dicyclopentadienylboron chloride. The compounds having the formula $M'R^{IV}_3$ include trimethylaluminum, triethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-tolylboron and tricyclohexylboron. The compounds having the formula $M''X'_3$ include aluminum trichloride, aluminum tribromide, aluminum triiodide, partially fluorinated aluminum chloride, boron trichloride, boron trifluoride, boron tribromide and boron triiodide.

The organic compounds of metals of Group IIb, IIIb or IVb of the Mendeleev's Periodic Table which are used as the catalysts of item (2) are those having, as metal components thereof, zinc, cadmium, mercury, boron, aluminum, gallium, indium, thallium, germanium, tin and lead. Particularly, the metal components of zinc, boron, aluminum and tin are frequently employed. As the organic groups, hydrocarbon groups or substituted groups thereof are preferable, and those having alkyl, alkenyl, aryl, aralkyl, alkylaryl or cycloalkyl groups are particularly effective. Those organo-metallic compounds include also the case where other groups than organic groups are attached to the metal. Particularly useful are organo-metallic compounds having the formula:

$$M'''R^V_nX''_{p-n}$$

wherein M''' is a metal of Group IIb, IIIb or IVb of the Mendeleev's Periodic Table; $R^V$ is a hydrocarbon group having 1 to 20 carbon atoms or a substituted hydrocarbon group thereof; $p$ is the valency of the metal; and $n$ is an arbitrary number of 1 to $p$. The organo-metallic compounds are particularly effective when $n=p$. Of course, other organic compounds of metals of Group IIb, IIIb or IVb of the Mendeleev's Periodic Table may also be used, if necessary. These compounds include, for example, diethylzinc, ethylzinc chloride, diethylcadmium, diethylmercury, diphenylmercury, triethylboron, tributylboron, tricyclohexylboron, ethylboron bromide, triethylaluminum, tributylaluminum, trihexylaluminum, tricyclohexylaluminum, vinyldiethylaluminum, diethylaluminum chloride, ethylaluminum sesquichloride, ethylaluminum dichloride, trimethylgallium, triethylgallium, triethylindium, tetraethylgermanium, tetramethyltin, tetraethyltin, tetraisobutyltin dimethyldiethyltin, tetraphenyltin, tetrabenzyltin, diethyldiphenyltin, triethyltin chloride, diethyltin dichloride, ethyltin trichloride, tetramethyllead, tetraethyllead, dimethyl-diethyllead and triethyllead chloride.

On the other hand, the metal halides to be employed are halides of metals of Group IIIb or IVb of the Mendeleev's Periodic Table and include, for example, compounds of boron, aluminum, gallium, indium, thallium, germanium, tin and lead. As the halogen, any of chlorine, bromine, iodine and fluorine are used. As these metal halides, those having other groups than halogen may also be used. Particularly useful metal halides in the process of the present invention are compounds having the formula $$M^{IV}X'''_mR^{IV}_{q-m}$$

wherein $M^{IV}$ is a metal of Group IIIb or IVb of the Mendeleev's Periodic Table; X''' is a halogen atom; $R^{IV}$ is a hydrocarbon group having 1 to 20 carbon atoms or a substituted hydrocarbon group thereof; $q$ is the valency of the metal; and $m$ is an arbitrary number of 1 to $q$. Generally, favorable results are easily obtained when $m=q$. Of course, other halides of metals of Group IIIb or IVb of the Mendeleev's Periodic Table may also be used, if necessary. Examples of metal halides useful for the process of the present invention are boron trichloride, boron trifluoride, boron tribromide, boron triiodide, ethylboron dichloride, diethylboron chloride, aluminum trichloride, aluminum tribromide, aluminum triiodide, partially fluorinated aluminum chloride, ethylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin dichloride, diisobutyltin dichloride, triethyltin chloride, lead tetrachloride and diethyllead dichloride.

In the catalysts of item (2), where is used the combination of an organic compound of Group IIb, IIIb or IVb of the Mendeleev's Periodic Table and a halide of a metal of Group IIIb or IVb of the Periodic Table, the organometallic compound and the metal halide are employed without previous mixing. The mixing of said components should be effected in the presence of at least said substituted conjugated vinyl compound. Particularly favorable results are obtained when the organo-metallic compound is added after the substituted conjugated compound and the metal halides have been mixed.

The organic peroxides to be used in the process of the present invention are the general organic compounds having peroxide linkages, and include, for example, diacyl peroxides, ketone peroxides, aldehyde peroxides, ether peroxides, hydroperoxides, dihydrocarbyl peroxides, peracid esters, dihydrocarbyl percarbonates and percarbamates. Examples of these compounds are benzoyl peroxide, lauroyl peroxide, 2,4-dichlorobenzoyl peroxide, 4-chlorobenzoyl peroxide, acetyl peroxide, stearoyl peroxide, phthaloyl peroxide, methylethylketone peroxide, cyclohexanone peroxide, t-butyl hydroperoxide, p-menthane hydroperoxide, diisopropylbenzene hydroperoxide, cumene hydroperoxide, di-t-butyl peroxide, dicumyl peroxide, t-butyl-cumyl peroxide, t-butyl perbenzoate, t-butyl perisobutyrate, t-butyl peroxypivalate, phenyl percarbamate, diisopropyl percarbonate and t-butyl perisopropyl carbonate, but the compounds are not limited thereto. There is observed such a tendency that the larger the rate of decomposition of the peroxide, the higher the promoting action of it.

In practicing the present invention, the catalyst components may be used at any proportions, but a proportion of 0.005–10 moles, particularly 0.02–1.5 moles, per mole of the substituted conjugated vinyl compound is frequently employed. Generally speaking, favorable results are liable to be obtained when the substituted conjugated vinyl compound is used in combination with a substantially equimolar amount of the halogen-containing metal compound. Of course, the metal compound may be used in excess or in less amount. However, in case the halogen-containing metal component is used in excessively smaller amount than the substituted conjugated compound, the polymerization activity is greatly lowered in some cases and therefore it is not desirable to make the concentration thereof excessively low. Generally, at relatively low concentrations, it is effective to carry out the polymerization particularly in the presence of an organic peroxide or oxygen. The effects of organic peroxide or oxygen are marked even at such a low temperature of —78° C., for example. Even when these components are used in relatively small amounts, sufficiently high effects can be expected. For example, promoting action is observed by addition of said components in amounts of about 0.01–5% of the substituted conjugated vinyl compound. Of course, the components can be effectively used even at higher or lower concentraitons than above. Generally speaking, desirable results are obtained by contacting and coordinating the halogen-containing metal compound with the substituted conjugated vinyl compound in such a state that no oxygen or organic peroxide is present. Depending on the condiitons, however, the catalyst components may be added later to the monomer mixture.

As the polymerization temperature, there may be selected any temperature ranging from such a low temperature as —150° C. to such a temperature as +100° C. The copolymerization reaction in accordance with the process of the present invention quickly progresses even at markedly low temperatures. This fact suggests that the activation energy is markedly small.

In the practice of the process of the present invention, bulk-polymerization can be effected in liquid monomers, but ordinary inert solvents may also be used. As such solvents, there are employed for example ordinary hydrocarbons or halogen-containing hydrocarbon compounds. These solvents include, for example, propane, butane, pentane, hexane, heptane, octane, ligroin, petroleum ether, other petroleum series mixed solvents, benzene, toluene, xylene, cyclohexane, methyl-cyclohexane, methylene dichloride, ethylene dichloride, trichloroethylene, tetrachloroethylene, butyl chloride, chlorobenzene and bromobenzene. As has been mentioned, compounds forming stable complexes with the catalyst components are not preferable as solvents.

After completion of the polymerization reaction, after-treatments are effected according to ordinary procedures to purify and recover polymerization resultants. As such procedures there is optionally adopted, for example, alcohol treatment, alcohol-hydrochloric acid treatment, hydrochloric acid-water treatment, or any after-treatment procedures employed in conventional cation polymerization using Lewis acids or in polymerization using Ziegler-Natta type catalysts. However, it is also possible to adopt procedures of separating and recovering catalyst components from polymerization resultants, without decomposition of the catalyst components, by addition of compounds forming complexes with said components.

The following examples illustrate the invention further in detail, but the invention is not limited thereto at all.

EXAMPLE 1

A 200 ml. three-necked flask provided with a stirrer was evacuated and flushed with nitrogen, then, was cooled to —78° C. Into the flask, 60 ml. of toluene and 3.2 g. of methyl methacrylate were added. To the mixture, 8 mmol. of ethylaluminum sesquichloride ($Al_2Et_3Cl_3$, as 0.2 g./ml. toluene solution) was added in nitrogen atmosphere. The mixture was elevated in temperature to 25° C. with thorough stirring. To the mixture, 5 g. of styrene was added and polymerization was effected for 5 hours. After terminating the polymerization by addition of methanol, the content was charged in a large amount of methanol, and insolubles were recovered, were thoroughly washed with methanol and were then dried at 50° C. under reduced pressure to obtain 1.54 g. of a white solid copolymer. This copolymer was soluble in acetone and insoluble in methanol and water. After reprecipitation and purification with acetone-methanol, the copolymer was dissolved in benzene and was subjected to viscosity measurement at 30° C. to obtain an intrinsic viscosity of 2.02 dl./g. The results of elementary analysis of the copolymer were C: 76.12% and H: 7.80%, and well coincided with the calculated values C: 76.40% and H: 7.90% as a 1:1 alternating copolymer. Further, the copolymer melted and softened at 231°–233° C. and, when pressed, gave a transparent film excellent in properties. The specific gravity of the film measured at 23° C. was 1.119. Even when the polymerization was effected under the same conditions while variously changing the proportion of monomers, the result of the elementary analysis of the product always showed 1:1 compositions. In addition, the nuclear magnetic resonance spectra of the products were obviously different from the random copolymer having 1:1 monomer composition obtained by ordinary radical polymerization, and it was clarified that the products showed the characteristics of alternating copolymers. From these facts, it was understood that the products obtained were alternating copolymers.

Similar copolymers were obtained when there was used, under the same conditions, diethylboron chloride, methyl-aluminum sesquibromide or a mixture of trihexyl-aluminum and aluminum chloride, respectively, in place of the ethylaluminum sesquichloride. Further, similar results were obtained in the case where p-bromostyrene or isopropenylbenzene was used, respectively, in place of the styrene.

EXAMPLE 2

A 300 ml. autoclave with a stirrer was evacuated and flushed with nitrogen, then was cooled to −78° C. Into the autoclave, 100 g. of ethylene, 25 mmol. of ethyl-aluminum sesquichloride (as 0.4 g./ml. heptane solution) and 20 ml. of heptane were added, and the compound were homogeneously admixed. To the mixture, 4 g. of methyl methacrylate was added and polymerization was effected with stirring for 3 hours. Thereafter, the same treatment as in Example 1 was conducted to obtain 0.35 g. of a white solid copolymer. The infrared absorption spectrum of the copolymer showed no absorption in the neighborhood of 720 cm.$^{-1}$, and it was known that the copolymer had no repetition of more than 4 methylene sequences. This indicates the fact that no ethylene-ethylene chain exists in the copolymer, and can be evidence to prove that the copolymer is an alternating copolymer.

EXAMPLE 3

A 300 ml. threee-necked flask equipped with a stirrer was evacuated, flushed with nitrogen and then, was cooled to −78° C. Into the flask, 30 g. of propylene and 4 g. of methyl methacrylate were added in a nitrogen atmosphere. To the mixture, 50 mmol. of ethylaluminum dichloride (AlEtCl$_2$, as 0.4 g./ml. heptane solution) was added and polymerization was effected for 20 hours to obtain 0.27 g. of a white solid copolymer. This copolymer was soluble in acetone. The copolymer was reprecipitated and purified with acetone-methanol, was dissolved in benzene and was subjected to viscosity measurement at 30° C. to obtain an intrinsic viscosity of 0.62 dl./g. The results of elementary analysis of the copolymer well coincided with the calculated values as an alternating copolymer. The copolymer melted at 163°–166° C. and gave an excellent film by hot press. The specific gravity of the copolymer measured at 23° C. was 1.103.

EXAMPLE 4

A 300 ml. glass autoclave with stirrer was evacuated, flushed with nitrogen and was cooled to −78° C. Into the autoclave, 50 ml. of toluene, 4 g. of methyl methacrylate and 40 mmol. of tin tetrachloride (as 1.3 g./ml. toluene solution) were added. To the mixture, 34 g. of propylene and 40 mmol. of triethylaluminum (as 0.2 g./ml. toluene solution) were further added. The temperature was elevated to 0° C. with stirring, and polymerization was effected for 41 hours to obtain 0.13 g. of a white solid copolymer.

Similar results were obtained as well in the case where combinations of aluminum bromide-tributyl aluminum or of boron trifluoride-tetraethyl tin was used, respectively, as catalysts in place of the combination of tin tetrachloride and triethyl aluminum.

EXAMPLE 5

A 300 ml. glass autoclave provided with a stirrer was cooled to −78° C. Into the autoclave, 3 g. of methyl methacrylate and 12.5 mmol. of ethyl-aluminum sesqui-chloride (as 0.2 g./ml. toluene solution) were added in a nitrogen atmosphere. To the mixture, 30 g. of vinyl chloride and further a solution of 30 mg. of benzoyl peroxide in 20 ml. of toluene was added, with stirring. Thereafter, the temperature was elevated to 0° C., and polymerization was effected for 24 hours to obtain 320 g. of a white solid copolymer. The results of elementary analysis of the copolymer were C: 51.80%, H: 6.73% and Cl: 21.80% and well coincided with the calculated values for as alternating copolymer C: 51.70%, H: 6.82% and Cl: 21.80%.

Similar copolymers were obtained when, under the same conditions, vinyl bromide, vinylidene chloride, allyl chloride or 2-chloro-propene-1 was used, respectively, in place of the vinyl chloride.

EXAMPLE 6

A 200 ml. three-necked flask provided with a stirrer was evacuated and flushed with nitrogen and was cooled to −78° C. Into the flask, 50 ml. of cyclohexane, 20 mmol. of boron trichloride and 10 g. of methyl methacrylate were added in a nitrogen atmosphere, and the compounds, were thoroughly stirred. To the mixture, 11.8 g. of allylbenzene and further 20 mmol. of diethylzinc (as 0.2 g./ml. cyclohexane solution) were added. Thereafter, the temperature was elevated at 0° C. and polymerization was effected with stirring for 48 hours, while injecting a nitrogen gas containing 5% of oxygen, to obtain 1.45 g. of a white solid copolymer.

EXAMPLE 7

A 200 ml. three-necked flask provided with a stirrer was evacuated and flushed with nitrogen and was cooled to −78° C. To the flask, 20 ml. of toluene, 2.5 g. of n-butyl methacrylate and 12.5 mmol. of ethylaluminum sesquichloride (as 0.2 g./ml. toluene solution) were added in a nitrogen atmosphere, and the temperature was elevated to 0° C. with thorough stirring. Into the mixture, 15 g. of styrene was further charged, and polymerization was effected at 25° C. for 5 hours to otbain 1.69 g. of a white solid copolymer. The copolymer was reprecipitated and purified with acetone-methanol, was then dissolved in benzene and was subjected to viscosity measurement at 30° C. to obtain an intrinsic viscosity of 2.95 dl./g. The results of elementary analysis of the copolymer were C: 78.40% and H: 8.41%, and well coincided with the calculated value for an alternating copolymer C: 78.01% and H: 9.00%.

EXAMPLE 8

A 200 ml. three-necked flask provided with a stirrer was evacuated and flushed with nitrogen, and was cooled to −78° C. Into the flask, 60 ml. of toluene, 3.8 g. of methyl α-chloroacrylate and 8 mmol. of ethylaluminum sesquichloride (as 0.2 g./ml. toluene solution) were added in a nitrogen atmosphere, and the temperature was elevated to 25° C. with thorough stirring. To the mixture, 5 g. of styrene was further charged, and polymerization was effected at 25° C. for 2 hours to obtain 3.65 g. of a white solid copolymer. The results of elementary analysis of the copolymer were C: 64.30%, H: 5.99% and Cl: 14.15%, and well coincided with the calculated values for an alternating copolymer C: 64.15%, H: 5.83% and Cl: 15.78%.

Similar copolymers were obtained in the case where, under the same conditions, methyl α-ethyl-acrylate, methyl α-chloromethyl-acrylate, methyl thiolmethacrylate, ethyl methacrylate, methyl isopropenyl ketone, sodium methacrylate or methacryloyl chloride was used, respectively, in place of the methyl α-chloroacrylate.

EXAMPLE 9

A 200 ml. of three-necked flask provided with a stirrer was evacuated and flushed with nitrogen, and then was cooled to −78° C. Into the flask, 60 ml. of toluene, 2.8 g. of α-chloroacrylonitrile and 8 mmol. of ethylaluminum sesquichloride (as 0.2 g./ml. toluene solution) were added in a nitrogen atmosphere, and the temperature was elevated to 25° C. with thorough stirring. Into the mixture, 5 g. of styrene was charged, and polymerization was effected for 5 hours to obtain 2.19 g. of a white solid copolymer. The copolymer was reprecipitated and purified with acetone-methanol, was dissolved in dimethylformamide and was subjected to viscosity measurement at 30° C. to obtain an intrinsic viscosity of 0.20 dl./g. The results of elementary analysis of the copolymer were C: 69.19%, H: 5.89%, N: 7.01%, and Cl: 17.23% and well coincided with the calculated value for an alternating copolymer C: 68.93%, H: 5.26%, N: 7.31% and Cl: 18.50%.

EXAMPLE 10

A 200 ml. three-necked flask provided with a stirrer was evacuated and flushed with nitrogen, and was cooled to −78° C. Into the flask, 60 ml. of toluene, 2.1 g. of methacrylonitrile and 8 mmol. of ethylaluminum sesquichloride (as 0.2 g./ml. toluene solution) in a nitrogen atmosphere, and the temperature was elevated to 25° C. Into the mixture, 5 g. of styrene was further charged, and polymerization was effected at 25° C. for 18 hours to obtain 0.36 g. of a white solid copolymer. The copolymer was reprecipitated and purified with acetone-methanol, was dissolved in dimethylformamide and was subjected to viscosity measurement at 30° C. to obtain an intrinsic viscosity value of 0.54 dl./g. The results of elementary analysis of the copolymer were C: 84.26%, H: 7.92% and N: 8.19%, and well coincided with the calculated values of an alternating copolymer C: 84.17%, H: 7.65% and N: 8.18%. The copolymer melted at 160°–165° C. and, when pressed, gave a film. The specific viscosity of the film measured at 23° C. was 1.0215.

EXAMPLE 11

A 200 ml. three-necked flask provided with a stirrer was evacuated and flushed with nitrogen and was cooled to −78.° C. Into the flask, 10 ml. of toluene, 4.3 g. of methacrylamide and 12.5 mmol. of ethylaluminum sesquichloride (as 0.2 g./ml. toluene solution) were added in a nitrogen atmosphere, and the temperature was elevated to 0° C. To the mixture, 5.2 g. of styrene was further added, and polymerization was effected at 0° C. for 22 hours to obtain 1.27 g. of a copolymer.

EXAMPLE 12

A 200 ml. three-necked flask provided with a stirrer was evacuated and flushed with nitrogen and was cooled to −15° C. Into the flask, 40 ml. of heptane, 5 g. of methyl crotonate and 50 mmol. of ethylaluminum dichloride (as 0.4 g./ml. heptane solution) were added in a nitrogen atmosphere. Into the mixture, propylene was injected, and reaction was effected at −15° C. for 2 hours to obtain 0.18 g. of a white solid copolymer. After purification, the copolymer showed an intrinsic viscosity of 0.26 dl./g. when measured at 30° C. in benzene solution. The results of elementary analysis of the copolymer were C: 67.99% and H: 10.60%, and well coincided with the calculated values for an alternating copolymer, C: 67.57% and H: 99.92%.

EXAMPLE 13

A 200 ml. three-necked flask provided with a stirrer was evacuated and flushed with nitrogen and was cooled to −78° C. To the flask, 30 ml. of toluene, 10 g. of methyl cinnamate and 25 mmol. of ethylaluminum sesquichloride were added, and the temperature was elevated to 25° C. To the mixture, 20 g. of styrene was added, and polymerization was effected at 25° C. for 54 hours to obtain 0.41 g. of a white solid copolymer. After purification, the copolymer showed an intrinsic viscosity of 0.66 dl./g. when measured at 30° C. in benzene solution.

We claim:
1. A copolymer consisting essentially of a 1:1 alternating copolymer of monomer (A) and monomer (B), wherein monomer (A) is an olefinic compound having the formula:

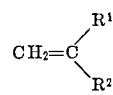

wherein $R^1$ and $R^2$ each are a hydrogen atom or a hydrocarbon radical having 1 to 20 carbon atoms selected from the group consisting of alkyl, aryl, aralkyl, alkylaryl and cycloalkyl, and wherein monomer (B) is a substituted conjugated vinyl compound having the formula:

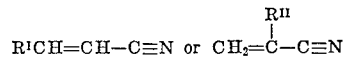

wherein $R^I$ and $R^{II}$ represent a hydrocarbon radical having 1 to 20 carbon atoms.

2. A copolymer according to claim 1, wherein $R^I$ and $R^{II}$ are alkyl having 1 to 20 carbon atoms.

3. A copolymer according to claim 1, wherein $R^I$ and $R^{II}$ are aryl, aralkyl, alkylaryl or cycloalkyl having 1 to 20 carbon atoms.

4. A copolymer consisting essentially of a 1:1 alternating copolymer of monomer (A) and monomer (B), wherein monomer (A) is an olefinic compound having the formula:

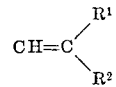

wherein $R^1$ and $R^2$ each are a hydrogen atom or a hydrocarbon radical having 1 to 20 carbon atoms selected from the group consisting of alkyl, aryl, aralkyl, alkylaryl and cycloalkyl, and wherein monomer (B) is a substituted conjugated vinyl compound having the formula:

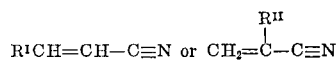

wherein $R^I$ and $R^{II}$ represent a halogen-containing hydrocarbon radical having 1 to 20 carbon atoms or a halogen atom.

5. A copolymer according to claim 4, wherein $R^I$ and $R^{II}$ are a halogen atom or halogen substituted alkyl, aryl, aralkyl, alkylaryl or cycloalkyl having 1 to 20 carbon atoms.

6. A copolymer consisting essentially of a 1:1 alternating copolymer of monomer (A) and monomer (B), wherein (A) is an olefinic compound having the formula:

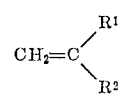

wherein $R^1$ and $R^2$ are a hydrogen atom, a halogen atom or a halogen-containing hydrocarbon radical having 1 to 20 carbon atoms wherein the hydrocarbon portion thereof is selected from the group consisting of alkyl, aryl, aralkyl, alkylaryl and cycloalkyl, provided that both $R^1$ and $R^2$ are not hydrogen at the same time, and wherein monomer (B) is a substituted conjugated vinyl compound having the formula:

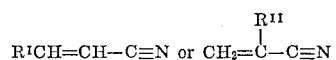

wherein $R^I$ and $R^{II}$ represent a hydrocarbon radical having 1 to 20 carbon atoms, a halogen-containing hydrocarbon radical having 1 to 20 carbon atoms or a halogen atom.

7. A copolymer according to claim 6, wherein $R^I$ and $R^{II}$ are a halogen atom or unsubstituted or halogen-substituted alkyl, aryl, aralkyl, alkylaryl or cycloalkyl having 1 to 20 carbon atoms.

8. A copolymer consisting essentially of a 1:1 alternating copolymer of monomer (A) and monomer (B), wherein monomer (A) is an olefinic compound having the formula:

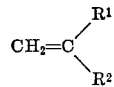

wherein $R^1$ and $R^2$ each are a hydrogen atom, a halogen atom, a hydrocarbon radical having 1 to 20 carbon atoms selected from the group consisting of alkyl, aryl, aralkyl, alkylaryl and cycloalkyl or a halogen-containing hydrocarbon radical having 1 to 20 carbon atoms wherein the hydrocarbon portion thereof is selected from the group consisting of alkyl, aryl, aralkyl, alkylaryl and cycloalkyl; and wheerin monomer (B) is a substituted conjugated vinyl compound having the formula:

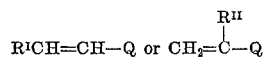

wherein $R^I$ and $R^{II}$ represent a hydrocarbon radical having 1 to 20 carbon atoms, a halogen-containing hydrocarbon radical having 1 to 20 carbon atoms or a halogen atom, and Q is a

group, wherein Y is $Z^2H$, $Z^2R$, $-Z^2)_k Me$, $NR'R''$, R, a halogen atom or a hydrogen atom; in which $Z^1$ and $Z^2$ each is an oxygen or a sulfur atom; R is a hydrocarbon or halohydrocarbon radical having 1 to 20 carbon atoms; R' and R'' each represents a hydrogen atom or hydrocarbon or halohydrocarbon radical having 1 to 20 carbon atoms, including the case where R' and R'' are mutually bonded at other portion than nitrogen; and Me represents an element of Groups I to III of Mendeleev's Periodic Table, wherein $k$ is equal to the valency of Me, or an ammonium group.

9. An alternating copolymer according to claim 8, wherein $R^I$ and $R^{II}$ are a halogen atom or unsubstituted or halogen-substituted alkyl, aryl, aralkyl, alkylaryl or cycloalkyl having 1 to 20 carbon atoms; wherein R is an unsubstituted or halogen substituted alkyl, aryl, aralkyl, alkylaryl or cycloalkyl having 1 to 20 carbon atoms; and wherein R' and R'' are unsubstituted or halogen-substituted alkyl, aryl, aralkyl, alkylaryl or cycloalkyl having 1 to 20 carbon atoms or a hydrogen atom.

10. A copolymer consisting essentially of a 1:1 alternating copolymer of monomer (A) and monomer (B), wherein monomer (A) is an olefinic compound having the formula:

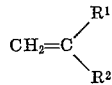

wherein $R^1$ and $R^2$ each are a hydrogen atom, a halogen atom, a hydrocarbon radical having 1 to 20 carbon atoms selected from the group consisting of alkyl, aryl, aralkyl, alkylaryl and cycloalkyl or a halogen-containing hydrocarbon radical having 1 to 20 carbon atoms wherein the hydrocarbon portion thereof is selected from the group consisting of alkyl, aryl, aralkyl, alkylaryl and cycloalkyl, and wheerin monomer (B) is a substituted conjugated vinyl compound having the formula:

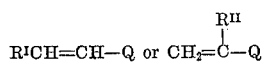

wherein $R^I$ and $R^{II}$ represent a hydrocarbon radical having 1 to 20 carbon atoms, a halogen-containing hydrocarbon radical having 1 to 20 carbon atoms or a halogen atom; and Q is a nitrile or

group, wherein Y is $Z^2H$, $Z^2R$, $-Z^2)_k Me$, $NR'R''$, R, a halogen atom or a hydrogen atom; in which $Z^1$ and $Z^2$ each is an oxygen or a sulfur atom; R is a hydrocarbon or halohydrocarbon radical having 1 to 20 carbon atoms; R' and R'' each represents a hydrogen atom or hydrocarbon or halohydrocarbon radical having 1 to 20 carbon atoms, including the case where R' and R'' are mutually bonded at other portion than nitrogen; and Me represents an element of Groups I to III of Mendeleev's Periodic Table, wherein $k$ is equal to the valency of Me, or an ammonium group.

11. A copolymer according to claim 1 wherein monomer (B) is methacrylonitrile.

12. A copolymer according to claim 1 wherein monomer (B) is α-ethylacrylonitrile.

13. A copolymer according to claim 3 wherein monomer (B) is α-cyclohexyl-acrylonitrile.

14. A copolymer according to claim 4 wherein monomer (B) is α-chloroacrylonitrile or α-chloromethyl acrylonitrile.

15. An alternating copolymer according to claim 6 wherein monomer (B) is methacrylonitrile, α-ethyl-acrylonitrile, α-cyclohexyl-acrylonitrile, α-chloroacrylonitrile or α-chloromethyl acrylonitrile.

16. An alternating copolymer according to claim 8 wherein monomer (B) is a conjugated vinyl compound substituted in the α- or β-position with a radical selected from the class consisting of a hydrocarbon radical having 1 to 20 carbon atoms, a halogen-containing hydrocarbon radical having 1 to 20 carbon atoms and a halogen atom and wherein said conjugated vinyl compound is selected from the group consisting of an acrylate, a thiolacrylate, a thionacrylate, a dithioacrylate, an acrylamide, a thioacrylamide, an N-substituted acrylamide, an N-substituted thioacrylamide, an N,N-disubstituted acrylamide, an N,N-disubstituted thioacrylamide, an acryloyl halide, a thioacryloyl halide, an acrylic acid, a thiolacrylic acid, a thionacrylic acid, a dithioacrylic acid, Groups I to III metal salts or ammonium salts of said acids, acrolein, and an unsaturated ketone.

17. An alternating copolymer according to claim 8, wherein said substituted conjugated vinyl compound is a conjugated vinyl compound having a group in the α- or β-position selected from the class consisting of a hydrocarbon group having 1 to 20 carbon atoms, a halogen-containing hydrocarbon group having 1 to 20 carbon atoms, and a halogen atom and wherein said conjugated vinyl compound is selected from the group consisting of an acrylate, a thiolacrylate, acrylamide, an N-substituted acrylamide, an N,N-disubstituted acrylamide, an acryloyl halide, an acrylic acid, a thiolacrylic acid, Groups I to III metal salts or ammonium salts of said acids, acrolein and an unsaturated ketone.

18. An alternating copolymer according to claim 8 wherein monomer (B) is selected from the group consisting of methyl methacrylate, ethyl methacrylate, propyl methacrylate, butyl methacrylate, octyl methacrylate, octadecyl methacrylate, benzyl methacrylate, phenyl methacrylate, tolyl methacrylate, cyclohexyl methacrylate, 2-chloroethyl methacrylate, methyl thiolmethacrylate, ethyl thiolmethacrylate, methyl α-ethylacrylate, ethyl α-butylacrylate, methyl α-cyclohexylacrylate, methyl α-phenylacrylate, methyl α-chloroacrylate, ethyl α-chloroacrylate, methyl α-bromoacrylate, methyl α-chloromethylacrylate, methyl α-(p-chlorophenyl) acrylate, methacrylamide, N-ethyl methacrylamide, N-cyclohexyl-methacrylamide, N,N-dimethyl methacrylamide, methacrylyl piperidine, α-ethyl-acrylamide, α-chloroacrylamide, α-ethyl-methacryloyl chloride, methacrylic acid, thiolmethacrylic acid, sodium methacrylate, zinc methacrylate, aluminum methacrylate, ammonium α-fluoroacrylate, methacrolein, methyl-isopropenyl-ketone, 1-chloro-butenyl-ethyl-ketone, methyl crotonate, ethyl crotonate, butyl crotonate, phenyl crotonate, cyclohexyl crotonate, crotonamide, crotonic acid chloride, crotonitrile, methyl cinnamate, ethyl cinnamate, butyl cinnamate, chloromethyl cinnamate, cinnamic nitrile, methyl β-ethyl acrylate and methyl β-chloromethyl acrylate.

19. An alternating copolymer according to claim 8 wherein R¹ and R² are a hydrogen atom, a halogen atom, or an unsubstituted or halogen-substituted alkyl, aryl, aralkyl, alkylaryl or cycloalkyl having 1 to 20 carbon atoms.

20. An alternating copolymer according to claim 8 wherein monomer (A) is selected from the group consisting of ethylene, propylene, butene-1, isobutene, pentene-1, hexene-1, heptene-1, octene-1, 2-methyl-butene-1, 3 - methyl-butene - 1, 2-methyl-pentene-1, 4-methyl-pentene - 1, 4 - methyl-hexene-1, decene-1, dodecene-1, octadecene-1, 4-phenyl-butene-1, styrene, α-methyl-styrene, α - butyl-styrene, p - methyl-styrene, m-methyl-styrene, vinyl-cyclobutane, vinyl-cyclohexane, isopropenyl-benzene, vinyl-naphthalene, 1-methylene-cyclobutane and allkyl-benzene, vinyl chloride, vinyl bromide, vinyl iodide, allyl chloride, allyl bromide, allyl iodide, 4-chloro-butene-1, 4,4,4 - trichloro-butene-1, p-chloro-styrene, o - chloro-styrene, m-bromo-styrene, p-iodo-styrene, p - fluoro-styrene, 4 - chloro-vinyl-cyclohexane, p-chloro-allyl-benzene, 2,4 - dichloro-styrene, 2,6 - dichlorostyrene, 2,4 - difluoro-styrene, 3-trifluoromethyl-styrene, 4-chloro-1-vinyl-naphthalene, vinylidene chloride, vinylidene bromide, 2-chloro-propene-1, 1-bromo-1-chloro-ethylene, 2-chloro-allyl chloride, methallyl chloride and 1,1-bis(p-chlorophenyl)-ethylene.

21. An alternating copolymer according to claim 8 wherein said monomer (A) is selected from the group consisting of propylene, isobutylene, styrene, vinyl halide and vinylidene halide.

22. An alternating copolymer according to claim 8 wherein said monomer (A) is selected from the group consisting of propylene, isobutylene, styrene, a vinyl halide and a vinylidene halide, and said monomer (B) is a conjugated vinyl compound substituted in the α- or β-position by a radical selected from the group consisting of methyl, ethyl, phenyl, chloromethyl, 2-chloroethyl, chlorine and bromine, and wherein said conjugated vinyl compound is selected from the group consisting of an acrylate, an acrylamide, and acrylic acid.

23. An alternating copolymer according to claim 22 wherein the monomer (B) is a methacrylate, an α-chloro-acrylate, methacrylic acid, a methacrylamide, an α-chloromethyl acrylate, a crotonate or a cinnamate.

24. An alternating copolymer according to claim 9 wherein R¹ and R² each are a hydrogen atom, a halogen atom, or an unsubstituted or halogen-substituted alkyl, aryl, aralkyl, alkylaryl or cycloalkyl having 1 to 20 carbon atoms.

25. An alternating copolymer according to claim 18 wherein monomer (A) is selected from the group consisting of ethylene, propylene, butene-1, isobutene, pentene-1, hexene-1, heptene-1, octene-1, 2-methyl-butene-1, 3-methyl-butene-1, 2 - methyl-pentene-1, 4 - methyl-pentene-1, 4 - methyl-hexene-1, decene-1, dodecene-1, octadecene-1, 4-phenyl-butene-1, styrene, α-methyl-styrene, α-butyl-styrene, p-methyl-styrene, m-methyl-styrene, vinyl-cyclobutane, vinyl-cyclohexane, isopropenyl-benzene, vinyl-naphthalene, 1 - methylene-cyclobutane and allyl-benzene, vinyl chloride, vinyl bromide, vinyl iodide, allyl chloride, allyl bromide, allyl iodide, 4-chloro-butene-1, 4,44 - trichloro-butene-1, p-chloro-styrene, o-chloro-styrene, m-bromo-styrene, p-iodo-styrene, p-fluoro-styrene, 4-chlorovinyl-cyclohexane, p-chloro-allyl-benzene, 2,4-dichloro-styrene, 2,6 - dichloro-styrene, 2,4-difluoro-styrene, 3-trifluoromethyl-styrene, 4-chloro-1-vinyl-naphthalene, vinylidene chloride, vinylidene bromide, 2-chloro-propene-1, 1-bromo-1-chloro-ethylene, 2-chloro-allyl chloride, methallyl chloride, and 1,1-bis(p-chlorophenyl)-ethylene.

26. A process for producing an alternating copolymer, which comprises contacting at a temperature of from about −150° C. to about +100° C. monomer (A) and monomer (B) defined in claim 8 with (1) an organo-metal halide having the formula:

$$MR'''_n X_{3-n}$$

wherein M is aluminum or boron; R''' is a hydrocarbon radical having 1 to 20 carbon atoms; X is a halogen atom; and $n$ is an arbitrary number of from 1 to 2, or with a mixture of at least two compounds having the following formulae:

(A) $MR'''_n X_{3-n'}$  (B) $M'R^{IV}_3$ and  (C) $M''X'_3$ wherein M, M' and M'' each represents aluminum or boron; R''' and $R^{IV}$ each represents a hydrocarbon radical having 1 to 20 carbon atoms; X and X' each represents a halogen atom; and $n$ is an arbitrary number from 1 to 2, or with a catalyst (2) comprising component (a) an organo-compound having the formula:

$$M'''R^V_n X''_{p-n}$$

wherein M''' is a metal of Group IIb, IIIb, or IVb of Mendeleev's Periodic Table; $R^V$ is a hydrocarbon group having 1 to 20 carbon atoms; $p$ is the valency of the metal; and $n$ is an arbitrary number of 1 to $p$, and component (b) a halogeno-compound having the formula:

$$M^{IV}X'''_m R^{VI}_{q-m}$$

wherein $M^{IV}$ is a metal of Group IIIb or IVb of the Periodic Table; X''' is a halogen atom; $R^{VI}$ is a hydrocarbon group having 1 to 20 carbon atoms; $q$ is the valency of the metal; and $m$ is an arbitrary number of 1 to $q$, provided that the metal of at least one of components (a) and (b) is aluminum or boron, provided that components (a) and (b) are different and provided that catalyst component (a) is contacted with catalyst component (b) in the presence of at least the conjugated vinyl compound monomer of Group (B).

27. A process for producing an alternating copolymer, which comprises contacting at a temperature of from about −150° C. to about +100° C. monomer (A) and monomer (B) as defined in claim 8 with a catalyst (1) an organo-metal halide having the formula:

$$MR'''_n X_{3-n}$$

wherein M is aluminum or boron; R''' is a hydrocarbon radical of 1 to 20 carbon atoms; X is a halogen atom; and $n$ is an arbitary number of from 1 to 2, or with a catalyst (2) comprising $$M'''R^V_n X''_{p-n}$$

wherein M''' is a metal of Group IIb, IIIb or IVb of Mendeleev's Periodic Table; $R^V$ is a hydrocarbon group having 1 to 20 carbon atoms; $p$ is the valency of the metal; and $n$ is an arbitrary number of 1 to $p$, and component (b) a halogeno-compound having the formula:

$$M^{IV}X'''_m R^{VI}_{q-m}$$

wherein $M^{IV}$ is a metal of Group IIIb or IVb of the Periodic Table; X''' is a halogen atom; $R^{VI}$ is a hydrocarbon group having 1 to 20 carbon atoms; $q$ is the valency of the metal; and $m$ is an arbitrary number of 1 to $q$, provided that the metal of at least one of components (a) and (b) is aluminum or boron, provided that components (a) and (b) are different, and provided that catalyst component (a) is contacted with catalyst component (b) in the presence of at least the conjugated vinyl compound monomer of Group (B).

28. A process for producing an alternating copolymer, which comprises contacting at a temperature of from about −150° C. to about +100° C. monomer (A) and monomer (B) defined in claim 8 with an organo-metal halide selected from the group consisting of the aluminum and boron compounds having the formula:

$$MR'''_n X_{3-n}$$

wherein M is aluminum or boron; R''' is a hydrocarbon radical having 1 to 20 carbon atoms; X is a hologen atom; and n is an arbitrary number of from 1 to 2.

29. A process for producing an alternating copolymer, which comprises contacting the olefinic compound and the substituted conjugated vinyl compound defined in claim 8 with a catalyst comprising component (a) an organo-compound having the formula:

$$M'''R^V_n$$

wherein M''' is a metal of Group IIb, IIIb or IVb of Mendeleev's Periodic Table; $R^V$ is a hydrocarbon group having 1 to 20 carbon atoms; n is the valency of the metal, and component (b) a halogeno-compound having the formula:

$$M^{IV}X'''_m$$

wherein $M^{IV}$ is a metal of Group IIIb or IVb of the Periodic Table; X''' is a halogen atom; and m is the valency of the metal, provided that the metal of at least one of the components (a) and (b) is aluminum or boron, and provided that the catalyst component (a) is contacted with catalyst component (b) in the presence of at least the conjugated vinyl compound monomer of Group (B).

30. A process for producing an alternating copolymer, which comprises contacting at a temperature of from about −150° C. to about +100° C. in the presence of from about 0.01% to about 5% of oxygen or an organic peroxide based on the conjugated monomer, the olefinic compound and the substituted conjugated vinyl compound defined in claim 8 wherein Q is a nitrile or said $$\begin{array}{c} -\text{C}-\text{Y} \\ \parallel \\ \text{Z} \end{array}$$

group with (1) an organo-metal halide having the formula:

$$MR'''_n X_{3-n}$$

wherein M is aluminum or boron; R''' is a hydrocarbon radical having 1 to 20 carbon atoms; X is a halogen atom; and n is an arbitrary number of from 1 to 2, or with a mixture of at least two compounds having the following formulae:

(A) $MR'''_n X_{3-n}$, (B) $M'R^{IV}_3$ and (C) $M''X'_3$ wherein M, M' and M'' each represents aluminum or boron; R''' and $R^{IV}$ each represents a hydrocarbon radical having 1 to 20 carbon atoms; X and X' each represents a halogen atom; and n is an arbitrary number of from 1 to 2, or with a catalyst (2) comprising an organo-compound having the formula:

$$M'''R^V_n X''_{p-n}$$

wherein M''' is a metal of Group IIb, IIIb or IVb of Mendeleev's Periodic Table; $R^V$ is a hydrocarbon group having 1 to 20 carbon atoms; p is the valency of the metal; and n is an arbitrary number of 1 to p, and component (b) a halogeno-compound having the formula:

$$M^{IV}X'''_m R^{VI}_{q-m}$$

wherein $M^{IV}$ is a metal of Group IIIb or IVb of the Periodic Table; X''' is a halogen atom; $R^{VI}$ is a hydrocarbon group having 1 to 20 carbon atoms; q is the valency of the metal; and m is an arbitrary number of 1 to q, provided that the metal of at least one of components (a) and (b) is aluminum or boron, provided components (a) and (b) are different and provided that catalyst component (a) is contacted with catalyst component (b) in the presence of at least the conjugated vinyl compound monomer of Group (B).

31. A process according to claim 26, wherein the copolymerization reaction is effected in a liquid monomer, a hydrocarbon medium or a halogen-containing hydrocarbon medium.

32. A process according to claim 26, wherein the catalyst component is used at a proportion of 0.005 to 10 moles per mole of the substituted conjugated vinyl compound.

33. A process according to claim 26, wherein the halogen-containing metal compound is used in an amount substantially equimolar to the amount of the conjugated monomer.

34. A process for producing an alternating copolymer, which comprises contacting at a temperature of from about −150° C. to about +100° C. monomer (A) and monomer (B) defined in claim 8 with an organometal halide selected from the group consisting of alkylaluminum dihalide, alkylaluminum sesquihalide, dialkylaluminum halide, alkylboron, dihalide and dialkylboron halide.

35. A process according to claim 26 wherein the compound of the formula $MR'''_n X_{3-n}$ is selected from the group consisting of methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, allylaluminum dichloride, ethylaluminum sesquichloride, ethylaluminumsesquibromide, ethylaluminum sesquifluoride, methylaluminum sesquichloride, diethylaluminum chloride, diethylaluminum fluoride, ethylphenylaluminum chloride, dicyclohexylaluminum chloride, methylboron dichloride, ethylboron dichloride, ethylboron diiodide, butylboron dichloride, hexylboron dichloride, dodecylboron dichloride, phenylboron dichloride, benzylboron dichloride, cyclohexylboron dichloride, diethylboron chloride, diethylboron bromide, dipropylboron chloride, dibutylboron chloride, dihexylboron chloride, ethylvinylboron chloride and dicyclopentadienylboron chloride, wherein the compound of the formula $M'R^{IV}_3$ is selected from the group consisting of trimethylaluminum, triethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-tolylboron and tricyclohexylboron; wherein the compound of the formula $M''X'_3$ is selected from the group consisting of aluminum trichloride, aluminum tribromide, aluminum triiodide, partially fluorinated aluminum chloride, boron trichloride, boron trifluoride, boron tribromide and boron triiodide; wherein the compound of the formula $$M'''R^V_n X''_{p-n}$$

is selected from the goup consisting of diethylzinc, ethylzinc chloride, diethylcadmium, diethylmercury, diphenylmercury, triethylboron, tributylboron, tricyclohexylboron, ethylboron bromide, triethylaluminum, tributylaluminum, trihexylaluminum, tricyclohexylaluminum, vinyldiethylaluminum, diethylaluminum chloride, ethylaluminum sesquichloride, ethylaluminum dichloride, trimethylgallium, triethylgallium, triethylindium, tetraethylgermanium, tetramethyltin, tetraethyltin, tetraisobutyltin, dimehyldiethyltin, tetraphenyltin, tetrabenzyltin, diethyldiphenylin, triethyltin chloride, diethyltin dichloride, ethyltin trichloride, tetramethyllead, tetraethyllead, dimethyl-diethyllead and triethyllead chloride; and wherein the compound of the formula $M^{IV}X'''_m R^{IV}_{q-m}$ is selected from the group consisting of boron trichloride, boron trifluoride, boron tribromide, boron triiodide, ethylboron dichloride, diethylboron chloride, aluminum trichloride, aluminum tribromide, aluminum triiodide, partially fluorinated aluminum chloride, ethylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin dichloride, diisobutyltin dichloride, triethyltin chloride, lead tetrachloride and diethyllead dichloride.

36. A process according to claim 30 wherein said organic peroxide is selected from the group consisting of diacyl peroxides, ketone peroxides, aldehyde peroxides, ether peroxides, hydroperoxides, dihydrocarbyl peroxides, peracid esters, dihydrocarbyl percarbonates and percarbamates.

37. A process according to claim 36 wherein said organic peroxide is selected from the group consisting of benzoyl peroxide, lauroyl peroxide, 2,4-dichlorobenzoyl peroxide, 4-chlorobenzoyl peroxide, acetyl peroxide, stearoyl peroxide, phthaloyl peroxide, methylethylketone peroxide, cyclohexanone peroxide, t-butyl hydroperoxide, p-menthane hydroperoxide, diisopropylbenzene hydroperoxide, cumene hydroperoxide, di-t-butyl peroxide, dicumyl peroxide, t-butyl-cumyl peroxide, t-butyl perbenzoate, t-butyl perisobutyrate, t-butyl peroxypivalate, phenyl percarbamate, diisopropyl percarbonate and t-butyl perisopropyl carbonate.

38. A process for producing an alternating copolymer, which comprises contacting at a temperature of from about −150° C. to about 100° C. monomer (A) and monomer (B) defined in claim 1 with (1) an organo-metal halide having the formula:

$$MR'''_n X_{3-n}$$

wherein M is aluminum or boron; R''' is a hydrocarbon radical having 1 to 20 carbon atoms; X is a halogen atom; and $n$ is an arbitrary number of from 1 to 2, or with a mixture of at least two compounds having the following formulae:

(A) $MR'''_n X_{3-n}$, (B) $M'R^{IV}_3$ and (C) $M''X'_3$ wherein M, M' and M'' each represents aluminum or boron; R''' and $R^{IV}$ each represents a hydrocarbon radical having 1 to 20 carbon atoms; X and X' each represents a halogen atom; and $n$ is an arbitrary number from 1 to 2, or with a catalyst (a) comprising component (a) an organo-compound having the formula:

$$M'''R^V_n X''_{p-n}$$

wherein M''' is a metal of Group IIb, IIIb or IVb of Mendeleev's Periodic Table; $R^V$ is a hydrocarbon group having 1 to 20 carbon atoms; $p$ is the valency of the metal; and $n$ is an arbitrary number of 1 to $p$, and component (b) a halogeno-compound having the formula:

$$M^{IV}X'''_m R^{VI}_{q-m}$$

where $M^{IV}$ is a metal of Group IIIb or IVb of the Periodic Table; X''' is a halogen atom; $R^{VI}$ is a hydrocarbon group having 1 to 20 carbon atoms; $q$ is the valency of the metal; and $m$ is an arbitrary number of 1 to $q$, provided that the metal of at least one of components (a) and (b) is aluminum or boron, provided that components (a) and (b) are different and provided that catalyst component (a) is contacted with catalyst component (b) in the presence of at least the conjugated vinyl compound monomer of Group (B).

39. A process for producing an alternating copolymer, which comprises contacting at a temperature of from about −150° C. to about 100° C. monomer (A) and monomer (B) defined in claim 4 with (1) an organo-metal halide having the formula:

$$MR'''_n X_{3-n}$$

wherein M is aluminum or boron; R''' is a hydrocarbon radical having 1 to 20 carbon atoms; X is a halogen atom; and $n$ is an arbitrary number of from 1 to 2, or with a mixture of at least two compounds having the following formulae:

(A) $MR'''_n X_{3-n}$, (B) $M'R^{IV}_3$ and (C) $M''X'_3$ wherein M, M' and M'' each represents aluminum or boron; R''' and $R^{IV}$ each represents a hydrocarbon radical having 1 to 20 carbon atoms; X and X' each represents a halogen atom; and $n$ is an arbitrary number from 1 to 2, or with a catalyst (a) comprising component (a) an organo-compound having the formula:

$$M'''R^V_n X''_{p-n}$$

wherein M''' is a metal of Group IIb, IIIb, or IVb of Mendeleev's Periodic Table; $R^V$ is a hydrocarbon group having 1 to 20 carbon atoms; $p$ is the valency of the metal; and $n$ is an arbitrary number of 1 to $p$, and component (b) a halogeno-compound having the formula:

$$M^{IV}X'''_m R^{VI}_{q-m}$$

where $M^{IV}$ is a metal of Group IIIb or IVb of the Periodic Table; X''' is a halogen atom; $R^{VI}$ is a hydrocarbon group having 1 to 20 carbon atoms; $q$ is the valency of the metal; and $m$ is an arbitrary number of 1 to $q$, provided that the metal of at least one of components (a) and (b) is aluminum or boron, provided that components (a) and (b) are different and provided that catalyst component (A) is contacted with catalyst component (b) in the presence of at least the conjugated vinyl compound monomer of Group (B).

40. A process for producing an alternating copolymer, which comprises contacting at a temperature of from about −150° C. to about 100° C. monomer (A) and monomer (B) defined in claim 6 with (1) an organo-metal halide having the formula:

$$MR'''_n X_{3-n}$$

wherein M is aluminum or boron; R''' is a hydrocarbon radical having 1 to 20 carbon atoms; X is a halogen atom; and $n$ is an arbitrary number of from 1 to 2, or with a mixture of at least two compounds having the following formulae:

(A) $MR'''_n X_{3-n}$, (B) $M'R^{IV}_3$ and (C) $M''X'_3$ wherein M, M' and M'' each represents aluminum or boron; R''' and $R^{IV}$ each represents a hydrocarbon radical having 1 to 20 carbon atoms; X and X' each represents a halogen atom; and $n$ is an arbitrary number from 1 to 2, or with a catalyst (a) comprising component (a) an organo-compound having the formula:

$$M'''R^V_n X''_{p-n}$$

wherein M''' is a metal of Group IIb, IIIb, or IVb of Mendeleev's Periodic Table; $R^V$ is a hydrocarbon group having 1 to 20 carbon atoms; $p$ is the valency of the metal; and $n$ is an arbitrary number of 1 to $p$, and component (b) a halogeno-compound having the formula:

$$M^{IV}X'''_m R^{VI}_{q-m}$$

where $M^{IV}$ is a metal of Group IIIb or IVb of the Periodic Table; X''' is a halogen atom; $R^{VI}$ is a hydrocarbon group having 1 to 20 carbon atoms; $q$ is the valency of the metal; and $m$ is an arbitrary number of 1 to $q$, provided that the metal of at least one of components (a) and (b) is aluminum or boron, provided that components (a) and (b) are different and provided that catalyst component (A) is contacted with catalyst component (b) in the presence of at least the conjugated vinyl compound monomer of Group (B).

41. A process for producing an alternating copolymer, which comprises contacting at a temperature of from −150° C. to about +100° C. monomer (A) and monomer (B) defined in claim 6 with an organo-metal halide selected from the group consisting of the aluminum and boron compounds having the formulae:

$$MR'''X_2,\ MR'''_{1.5}X_{1.5}\ \text{and}\ MR'''_2X$$

wherein M is aluminum or boron; R''' is a hydrocarbon radical having 1 to 20 carbon atoms; and X is a halogen atom.

(References on following page)

References Cited

UNITED STATES PATENTS

| | | | |
|---|---|---|---|
| 3,127,380 | 3/1964 | Welch | 260—85.5 |
| 3,159,607 | 12/1964 | D'Alelio | 260—82.1 |
| 3,169,079 | 2/1965 | Ferington et al. | 117—124 |
| 3,183,217 | 5/1965 | Serniuk | 260—85.5 |
| 3,326,870 | 6/1967 | Nakaguchi et al. | 260—85.5 |

WILLIAM H. SHORT, Primary Examiner

L. L. LEE, Assistant Examiner

U.S. Cl. X.R.

260—32.6 R, 32.8 R, 33.6 F, 33.6 UA, 63 R, 63 HA, 67 UA, 79.7, 85.5 XA, 86.3, 87.5 R, 87.5 A, 87.7, 88.1 R, 88.1 PN, 88.1 PC, 88.3 R